Jan. 30, 1962    T. L. FRANKLIN ETAL    3,018,553
MECHANICAL INTEGRATOR

Filed May 29, 1959    2 Sheets-Sheet 1

INVENTORS.
TRUMAN L. FRANKLIN &
JEAN R. WILLIAMS
BY
ATTORNEYS

Jan. 30, 1962 T. L. FRANKLIN ETAL 3,018,553
MECHANICAL INTEGRATOR
Filed May 29, 1959 2 Sheets-Sheet 2
FIG. 3
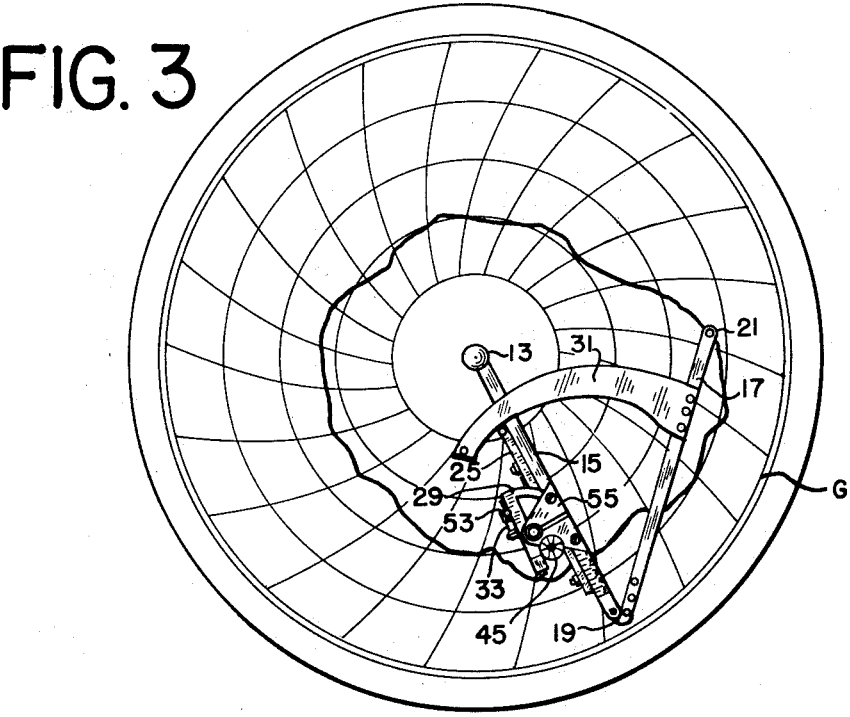
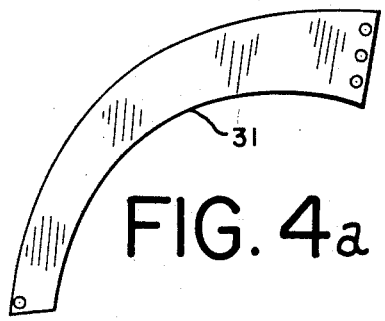
FIG. 4a
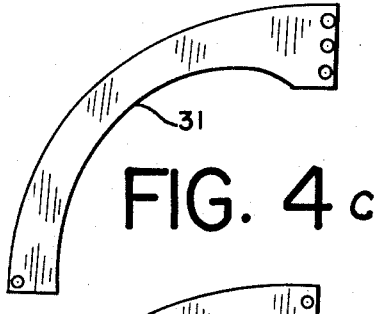
FIG. 4c
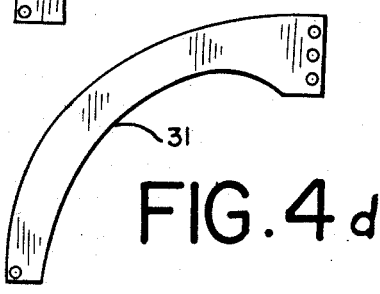
FIG. 4d
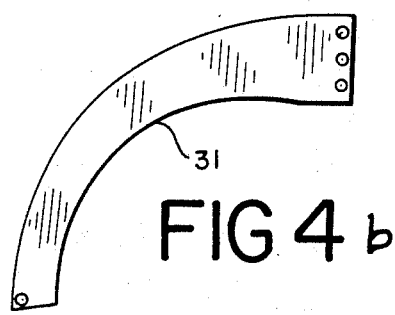
FIG 4b
INVENTORS.
TRUMAN L. FRANKLIN &
JEAN R. WILLIAMS
BY
ATTORNEYS ation of the relationship of the parts is correct

United States Patent Office 3,018,553
Patented Jan. 30, 1962

3,018,553
MECHANICAL INTEGRATOR
Truman L. Franklin and Jean R. Williams, Albuquerque, N. Mex., assignors to the United States of America as represented by the Secretary of the Air Force
Filed May 29, 1959, Ser. No. 817,003
4 Claims. (Cl. 33—1)
(Granted under Title 35, U.S. Code (1952), sec. 266)

The invention described herein may be manufactured and used by or for the United States Government for governmental purposes without payment to us of any royalty thereon.

This invention relates to an improved mechanical integrating apparatus and more particularly, the invention is concerned with providing a mechanical integrator for computing the value P of the integral $$P = \frac{1}{2\pi\sigma^2} \iint e^{\frac{-R^2}{2\sigma^2}} R \, dR \, d\theta$$

where R is the distance measured from the pole point or origin of the polar coordinate system (R, θ) which describes a surface and σ is a constant described by the statistical theory as the linear standard deviation.

The object of the present invention is to provide an improved mechanical integrator of the planimeter type for mechanically computing the integral of recorded or otherwise plotted diagrams and especially adapted for integrating the expression for the probability that a single given event will occur within the perimeter of a surface if all like events are distributed circularly normal about the pole or origin of the coordinate system.

The dimensions of the plane figure over which the integral is to be computed as well as the value of the linear standard deviation of the distribution function may, in actual practice, have almost any scale of values. Since the instrument herein described is of limited size, it will ordinarily be used with a drawing which is scaled to a convenient size. From simple considerations of dimensional analysis, it is obvious that the value of the integral computed is dimensionless and is therefore independent of the scale of the drawing.

The essential parts of the invention include a base structure having a pair of arms which are hinged one to the other, the axis of the hinge being normal to the work surface on which the figure to be evaluated is drawn. At the end of one arm, called the pole arm, is a pin having a point that is placed and fixed at the pole point or origin of the coordinate system. At an equal distance from the hinge axis on the other arm, called the tracing arm, is a tracing point which is used to trace out the perimeter of the plane figure which is being studied.

A counting assembly is attached to the pole arm near the hinge joint. The counting assembly consists essentially of a wheel and axle, a yoke and a drum. The yoke is mounted in a bearing causing it to rotate freely about a vertical axis or an axis normal to the surface. The wheel and axle are mounted in bearings in the yoke so that the axis of the wheel intersects the rotational axis of the yoke at right angles and in the plane of the wheel. This causes the wheel to travel at a constant radius from the pole point but allows the axis of the wheel to take varying angles to the radius from the pole point. The drum is concentric with the axis of the yoke and is used to control the angle of the wheel axis to the radius from the pole point by means of a band attached to a cam follower. An auxiliary counting wheel is geared to the main counting wheel to count the number of turns of the main counting wheel.

A simple radial cam is mounted on the tracing arm and engages a cam follower that is mounted on the pole arm. Thus, the location of the cam follower on the cam is determined by the distance between the pole point and the tracing point. The cam follower serves to control the angular position of the counting assembly by means of a drum and bands or by a rack and gear assembly instead. It is evident from the relationship of the parts just described that the angular position of the counting assembly and consequently its counting rate is determined as a function of $r$, the distance from pole point to tracing point.

Cams for the instrument are cut to provide the proper position of the counting wheel axis according to the equation $$\phi = \cos^{-1}\left(1 - e^{\frac{-R^2}{2\sigma^2}}\right)$$

where $\phi$ is the angle between the radius from the pole point to the counting wheel tangent point and the counting wheel axis. Only one value of σ, which is a linear dimension, can be obtained from a single cam. The cams, therefore, are made to be interchangeable so that any arbitrary number of values of σ can be used.

Many features and advantages of the invention and its operation as a mechanical integrator will become more apparent from the following detailed description taken in connection with the illustrative embodiment in the accompanying drawings wherein:

FIG. 3 is a plan view of the instrument being used to integrate a graphical record; and FIGS. 4a, 4b, 4c, and 4d are plan views of four typically shaped radial cams.

Figure 1:
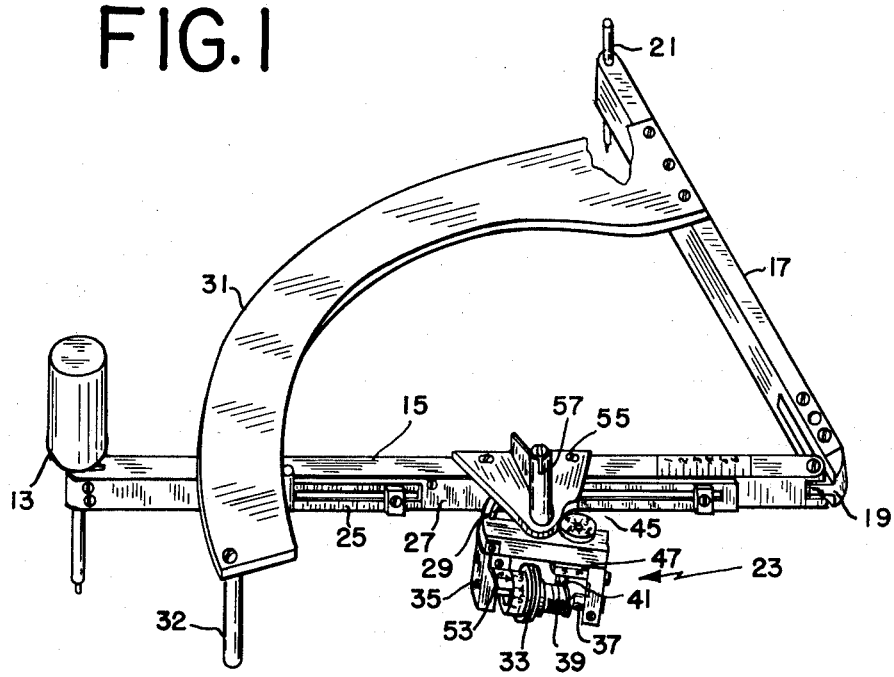
FIG. 1 is a general view in perspective of one embodiment of the mechanical integrator.
Figure 2:
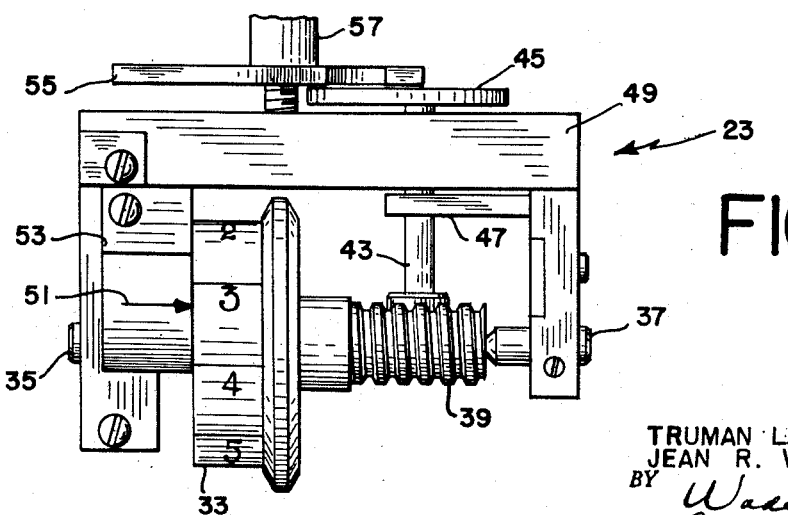
FIG. 2 is an enlarged view in elevation of the counting assembly.

Referring now to the accompanying drawings wherein similar reference characters designate similar parts throughout, the mechanical integrator embodying the present invention includes a center pin 13 having a sharp point at its lower end and attached to one end of a pole arm 15. The other end of the pole arm 15 is pivotally attached to one end of a tracing arm 17 forming the hinged joint 19. The other end of the tracing arm 17 has attached thereto a tracing point 21 which is used to trace around the perimeter of a plot of the expression being integrated.

A counting assembly 23 is attached to the pole arm 15 near the hinge joint 19. Slidably attached to the side of the pole arm 15 is a cam follower 25. A band 27 is fastened to the cam follower 25 and engages a drum 29. The drum 29 and the band 27 interact with each other to control the angular position of the counting assembly 23 while the tracing point 21 is tracing the perimeter of the graph being integrated.

The cam follower 25 engages a radial cam 31 which is cut according to a particular equation and provides the means for properly positioning the angular relationship of the counting assembly 23 with respect to the other part of the instrument. One end of the cam 31 is fixedly attached to the tracing arm 17 and the other end is supported by the upright support 32. The counting assembly 23 includes a main counting wheel 33 which turns on a pair of centers 35 and 37. A helical gear 39 is formed on the shaft of the counting gear 33 and engages with a gear 41 attached to one end of a shaft 43, the other end of the shaft 43 having an auxiliary counting wheel 45 attached thereto. A support arm 47 is provided to contain the bearing surface so that the shaft 43 can turn freely when driven by the helical gear 39 on the main counting wheel 33. A yoke 49 forms the framework in which the counting assembly and its associated parts are held. The reference line 51 is engraved on the fixed member 53 and acts to locate the circumferential position of the counting wheel 33.

It will be noted that the entire counting assembly 23 is pivotally attached to a supporting structure 55 which is fixedly attached to the pole arm 15. An elongated hollow cylindrical portion 57 is formed on the support member 55, and a shaft portion attached to the yoke 49 is inserted therein and interacts therewith to provide bearing means around which the counting assembly 23 can pivot.

The operation of the improved mechanical integrator is as follows: A cam 31 having a value of $\sigma$ which is appropriate to the problem at hand is chosen and installed on the tracing arm 17. The center point 13 is then placed at the point of the graph G which represents the center of the distribution function which is being studied. This establishes the pole or origin of the coordinate system. The tracing point 21 is then placed on some convenient point on the perimeter of the graph over which the integral is to be evaluated and the readings of the counting wheels 33 and 43 are noted. The perimeter of the plane figure is traced once around in a direction determined by the design of the instrument and the reading of the counting wheels 33 and 45 are again noted. In a properly calibrated instrument, the difference between the two readings will be the value of the integral being evaluated.

It will be understood to those skilled in the art that various changes may be made in the details of construction of the instrument, such as the substitution of a gear and rack arrangement in place of the drum 29 and band 27, without departing from the true spirit and scope of the invention.

What we claim is:

1. A mechanical integrator for evaluating a polar diagram comprising, a pair of elongated pivotally connected arms joined to each other to form a hinged joint, one of said arms being a pole arm, the other of said arms being a tracing arm, a pointed center pivot affixed to the free end of said pole arm, a tracing point affixed to the free end of said tracing arm, a counter assembly pivotally attached to said pole arm near the hinged joint, a changeable cam member attached to said tracing arm near said tracer point and extending toward and across said pole arm, a cam follower engaging said cam member and attached to said pole arm, and means for varying the relative angular position of said counting assembly with respect to a radial line from said pole point as the tracing point is guided around the perimeter of the polar diagram.

2. The mechanical integrator defined in claim 1 wherein the cam member attached to the tracing arm is cut according to the equation $$\phi = \cos^{-1}\left(1 - e^{\frac{-R^2}{2\sigma^2}}\right)$$

where $\phi$ is the angle of said counting assembly with respect to a radial line from said pole point.

3. A mechanical integrator for evaluating a polar diagram comprising, a pair of elongated arms each pivotally connected to the other at one end to form a hinged joint, one of said arms being a pole arm, the other of said arms being a tracing arm, a pointed center pivot affixed to the free end of said pole arm, a tracing point affixed to the free end of said tracing arm, a counter assembly pivotally attached to said pole arm near the hinged joint, means attached to said pole arm for producing angular rotation of said counter assembly proportional to the distance between said center pivot and said tracing point about an axis normal to the surface of the polar diagram being evaluated, a changeable cam member attached to said tracing arm near said tracing point and extending toward and across said pole arm, a cam follower engaging said cam member and slidably attached to the side of said pole arm, said cam follower being constructed and arranged such that said counting assembly is urged to rotate around its normal axis at a rate correspondingly proportional to the configuration of the attached cam member as the tracing point is guided around the perimeter of the polar diagram.

4. The mechanical integrator defined in claim 3 wherein the counting assembly includes a yoke mounted in a bearing allowing free rotation about a vertical axis, a counting wheel mounted on centers between the extending portions of said yoke, a helical gear machined on an elongated hub portion extending horizontally outward from said counting wheel, and means for measuring the revolutionary movement of said counting wheel resulting from the tracing of the perimeter of the polar diagram.

References Cited in the file of this patent

UNITED STATES PATENTS

| | | |
|---|---|---|
| 1,867,441 | Dall | July 12, 1932 |
| 2,458,009 | Lory | Jan. 4, 1949 |